(No Model.) 5 Sheets—Sheet 1.

T. SOWERBUTTS.
SCREW MAKING MACHINE.

No. 509,775. Patented Nov. 28, 1893.

Witnesses.
J. Brierley Howard
Charles Ainley

Inventor.
Thomas Sowerbutts (No Model.)  T. SOWERBUTTS.  5 Sheets—Sheet 2.
SCREW MAKING MACHINE.

No. 509,775.  Patented Nov. 28, 1893.

Witnesses.
J Brierley Howard
Charles Ainley

Inventor:
Thomas Sowerbutts (No Model.)   5 Sheets—Sheet 4.

T. SOWERBUTTS.
SCREW MAKING MACHINE.

No. 509,775.   Patented Nov. 28, 1893.

Witnesses.
J. Brierley Howard
Charles Ainley

Inventor.
Thomas Sowerbutts (No Model.)

T. SOWERBUTTS.
SCREW MAKING MACHINE.

No. 509,775.

Patented Nov. 28, 1893.

Witnesses
J Brierley Howard
Charles Ainley

Inventor.
Thomas Sowerbutts

THE NATIONAL LITHOGRAPHING COMPANY,
WASHINGTON, D. C.

UNITED STATES PATENT OFFICE.

THOMAS SOWERBUTTS, OF ACCRINGTON, ENGLAND.

SCREW-MAKING MACHINE.

SPECIFICATION forming part of Letters Patent No. 509,775, dated November 28, 1893.

Application filed May 31, 1893. Serial No. 476,012. (No model.)

*To all whom it may concern:*

Be it known that I, THOMAS SOWERBUTTS, a subject of Her Majesty the Queen of Great Britain, residing at Accrington, in the county of Lancaster, England, have invented a certain new and useful Improvement in Screw-Making Machines, of which the following is a specification.

My invention relates to the class of screw making machines in which the thread of the screw is cut upon the end of a continuous rotating rod or bar by means of non-rotating tools such threaded portion being subsequently headed and cut off to form a screw or screwed bolt.

The main features of the improvements which constitute my present invention consist in the means employed for holding the tools and for advancing and withdrawing them and in the means for recessing the head of the screw and for severing same from the rod.

Figure 1:
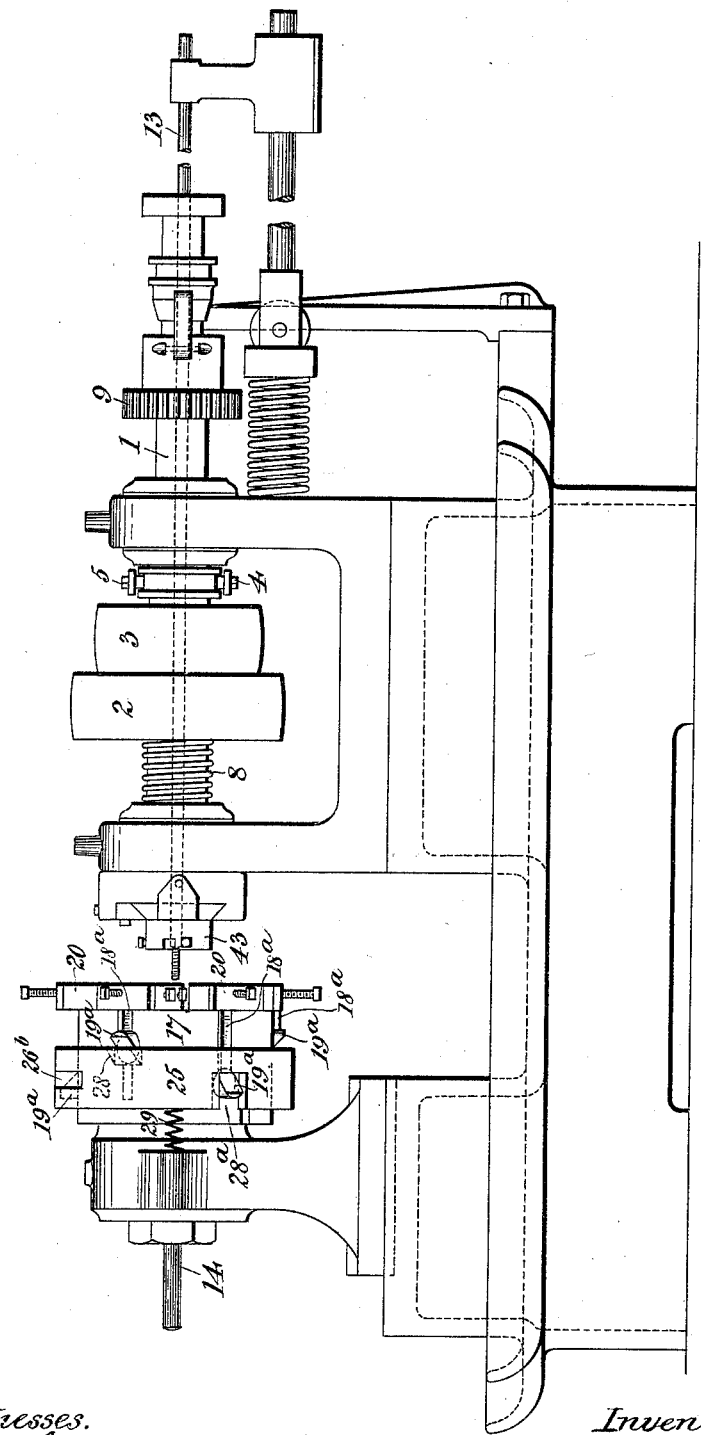
Figure 2:
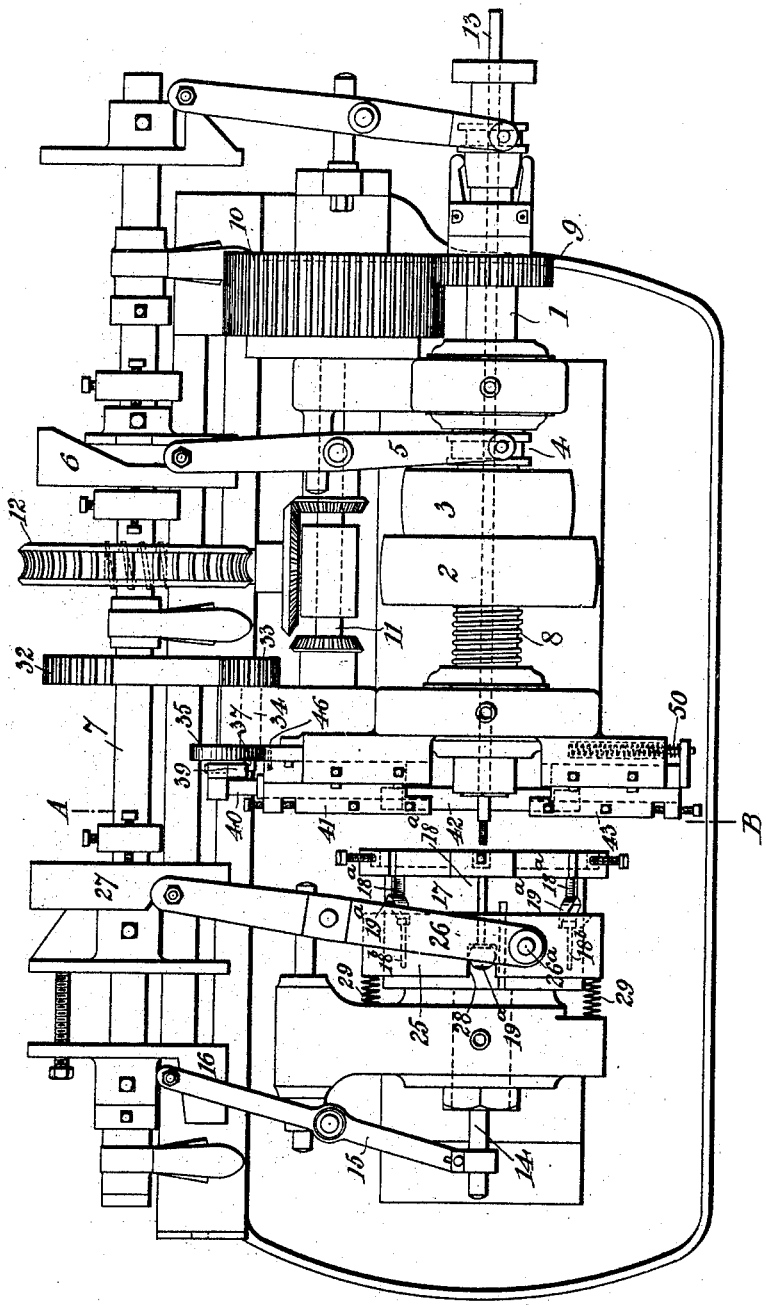
Figure 3:
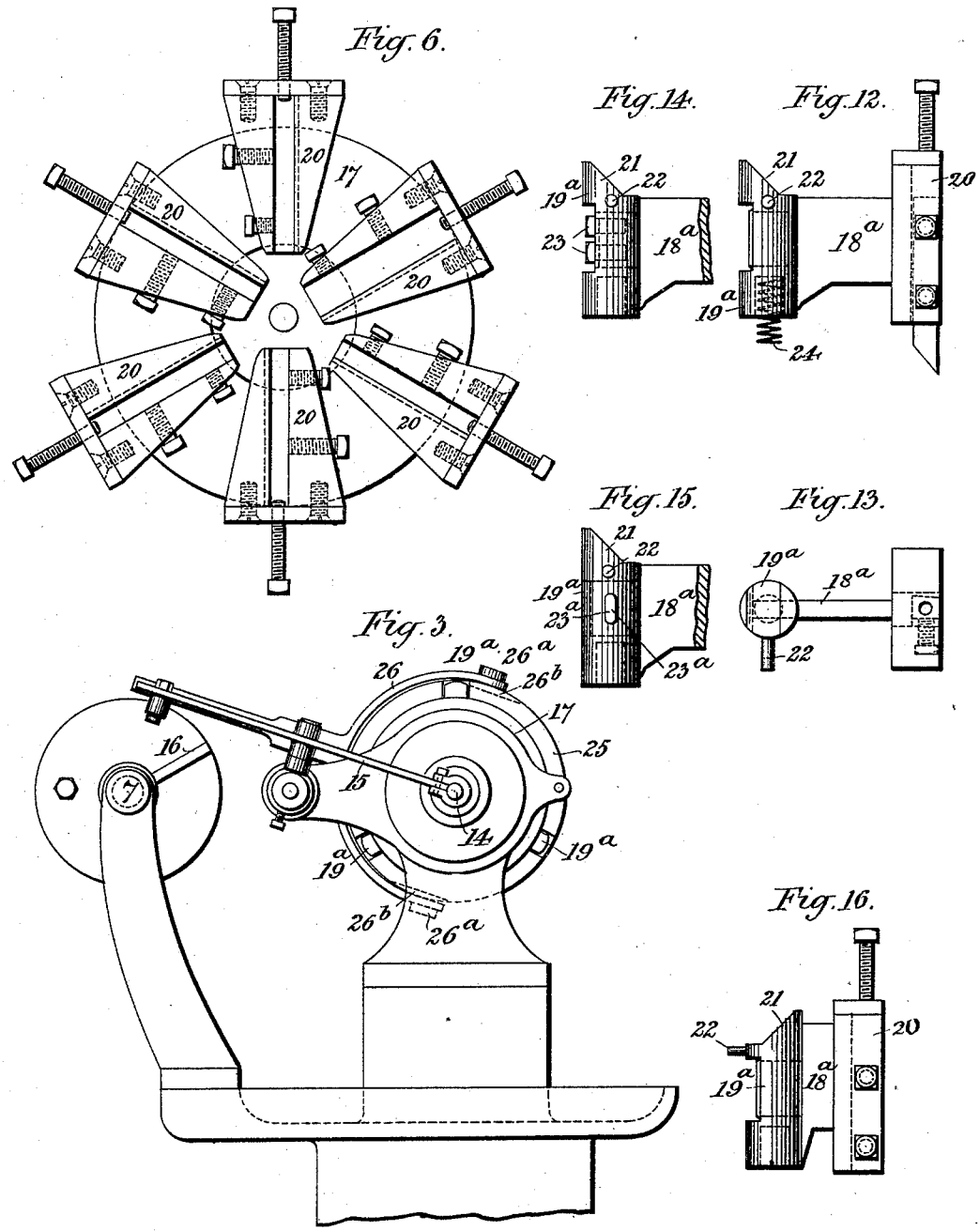
Figure 4:
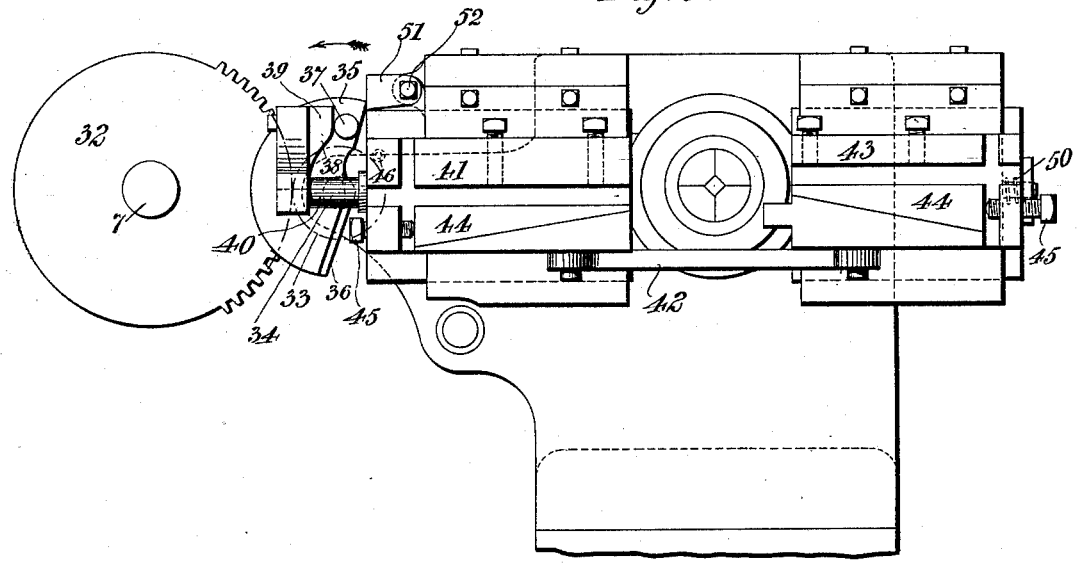
Figure 5:
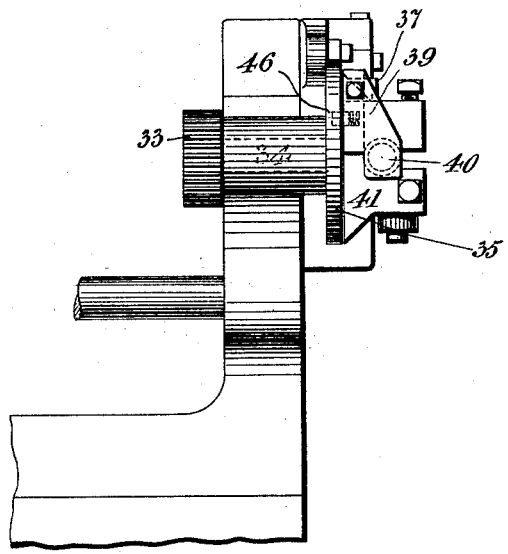
Figure 8:
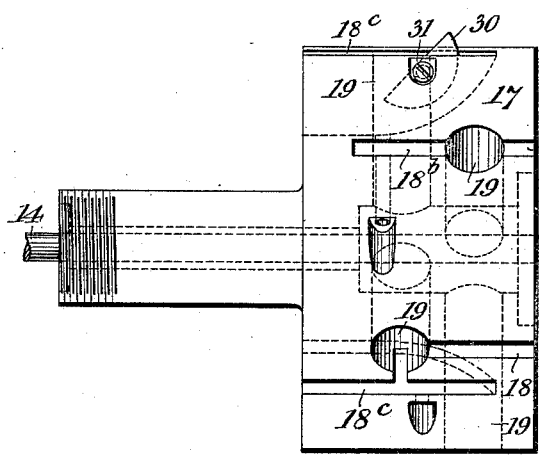
Figure 7:
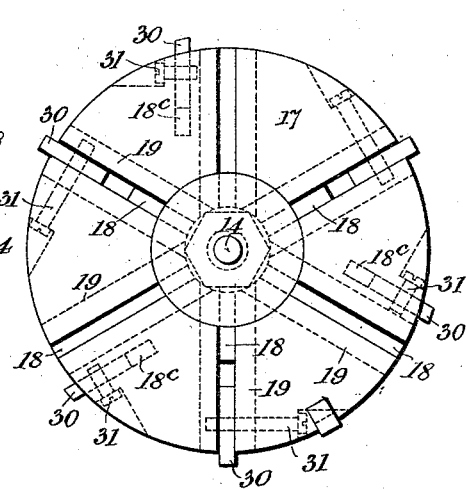
Figure 11:
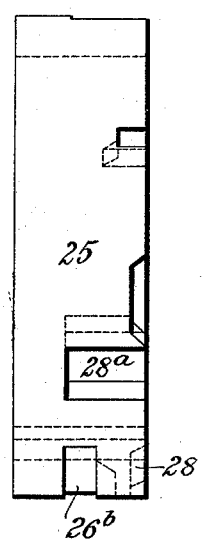
Figure 10:
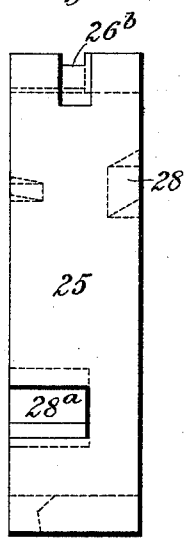
Figure 9:
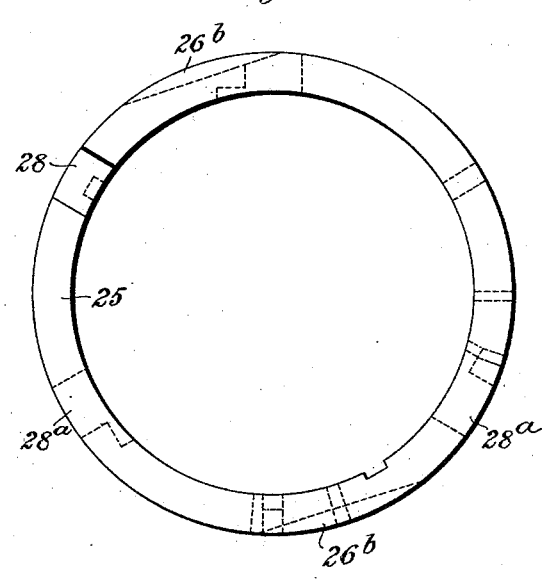

In the accompanying drawings:—Figure 1 is a side elevation of the machine. Fig. 2 is a plan of same. Fig. 3 is a view of the left hand end of Fig. 2. Fig. 4 is a view on an enlarged scale on line A. B of Fig. 2 looking to the right. Fig. 5 is an end view of Fig. 4 looking to the right the countershaft being omitted. Fig. 6 is a face view of the chuck on an enlarged scale showing the tool holders and operating ring. Fig. 7 is a face view of the chuck with the tool holders and operating ring removed. Fig. 8 is a side elevation of Fig. 7. Fig. 9 is a face view of the operating ring. Fig. 10 is a side view of same, looking at Fig. 9 from the left. Fig. 11 is a similar view looking at Fig. 9 from the right. Fig. 12 is an elevation of one of the tool holders. Fig. 13 is a plan of same. Figs. 14 and 15 are views showing portions only of the holders to illustrate certain means of attachment. Fig. 16 is an elevation of another tool holder.

The main shaft 1 of the machine is tubular, and carries different speed pulleys 2. 3 which are adapted to move laterally with the shaft by the action of a collar 4 with which engages a pivoted clutch lever 5 the other end of which is operated by a cam 6 on the countershaft 7. A spring 8 serves to return the pulleys and shaft after they have been moved by the lever 5. Upon the shaft 1 is a pinion 9 fixed thereto so as to move laterally therewith which drives a wide spur wheel 10 on a shaft 11 such shaft driving through suitable bevel wheels shaft and worm a worm wheel 12 on the counter shaft 7. Through the center of the main shaft 1 is passed the continuous rod 13 or material from which the screws are to be cut. This rod is gripped by suitable means carried by the main shaft such means being common in machines of this character, their effect being to hold the rod firmly while the shaft is reciprocated by the cam 6 and lever 5 before referred to so that the rod will traverse in front of the tools to enable the necessary screw threads to be cut by the fixed tools while when this operation is completed and the finished screw severed such means will release the rod, will retreat, take a fresh hold and feed forward a further length to the cutting tool such length in the present machine being determined by means of a rod 14 adjustably held by a pivoted lever 15 the other end of which is acted on by a cam 16 on the counter shaft 7. This rod 14 is thrust at regular intervals down the center of the chuck 17 so as to act as a stop to the forward movement of the rod 13 when the feeding device has taken a fresh hold and is thrusting it forward. The chuck 17 consists of a body portion in which are a number of radial grooves 18 enlarged at points into circular holes 19. These grooves 18 and holes 19 are adapted to receive respectively the web $18^a$ and cylindrical block $19^a$ of the radial tool holders 20 which are angled (see Fig. 6) to prevent the tools therein moving sidewise. The blocks $19^a$ are formed with inclines 21 on their upper portions, such inclines being in the reverse direction on some blocks to the others as shown by comparison of Fig. 12 with Fig. 16. In the drawings there are six tool holders and in this case three have inclines in one direction and three inclines in the other. The webs $18^a$ also are of different lengths depending upon the length of the grooves and position of the holes in the chuck 17 as will be seen by reference to Fig. 8, the object it may be here stated being to enable the tool holders to be brought into operation at different times. These tool holders are adapted to receive respectively the "rougher out" tool, "the stay," the "recesses" and the "chasers."

The blocks 19ª are provided with pins 22 which in the case of three of the blocks project from the side as shown in Figs. 12 and 13 while in the case of the other three project from the back as shown in Fig. 16. The blocks 19ª are secured to the webs 18ª by passing the ends of the webs through the blocks and turning them over or riveting them as shown in Figs. 12, 13 and 16 or the webs may be secured to the blocks by screws 23. 23 as shown in Fig. 14 or by a cotter pin 23ª through the side as shown in Fig. 15. In the lower part of the block 19ª is a hole adapted to receive a spiral spring 24 as shown in Fig. 12. Around the body of the chuck 17 is a loose ring 25 capable of sliding thereon and of acting when moving in one direction successively upon the inclined surfaces of three of the blocks 19ª so as to cause the tools to converge toward the center and toward each other and to act on the work and similarly upon the other three when moving in the reverse direction. To effect this movement of the ring 25 a forked lever 26 is attached thereto (Figs. 2 and 3) by means of pins 26ª which engage in slots 26ᵇ formed on the top and bottom of the ring. Such lever 26 is suitably pivoted so that its other end may be acted on by a cam 27 on the counter shaft 7. To assist in causing the ring to act successively upon the inclines 21 of the blocks 19ª beveled recesses 28 are formed on either edge of the ring so that the inclines opposite to these are not acted upon as soon as the inclines opposite to that part of the ring 28 which is not provided with such recesses. Slots or recesses 28ª (which are not beveled) are also formed at points in the edges of the ring to reduce the width of same where the tools opposite same are to be the last acted on. To cause the ring to slide in the reverse direction after it has been operated one way by the lever 26 and cam 27 spiral springs 29 are placed between said ring and standard forming part of the frame-work as shown in Figs. 1 and 2. The blocks 19ª and tool holders 20 after being depressed by the ring 17 are raised by means of the spiral springs 24 but to secure a more positive action or to provide for the contingency of the springs failing, I arrange a number of fingers or triggers 30 (Figs. 7 and 8) to act on each pin 22 of the blocks 19ª when the ring is moving in the reverse direction to that in which it has just operated the block, the result being that the finger 30 will lift the pin and block. These fingers 30 are pivotally hung on pins 31 three of them being placed in grooves 18ᵇ situated directly behind and in line with the grooves 18 so that they will act on the rear pins carried by the block sliding in the holes 19 of such grooves, and three being carried in grooves 18ᶜ located at the sides of the grooves 18 so that they will act on the side pins 22 of the other blocks 19ª the object being to enable each finger to lift the pins of the blocks when the ring 25 in traveling in a reverse direction to that in which it will depress the block in question comes in contact with them.

For the purpose of cutting off the screw or bolt when made from the rod 13 I employ the arrangement of slides illustrated in Figs. 1, 2, 4 and 5. These slides are operated from a toothed segment wheel 32 on the countershaft 7. The toothed parts of this wheel act upon a pinion 33 the spindle 34 of which passes through a part of the frame of the machine and carries a cam or disk 35, one edge 36 of this disk 35 being beveled. Near the circumference of the disk 35 is a stud 37 which as the disk is revolved by the pinion 33 comes in contact with the edge 38 of the inclined piece or cam 39. This cam is carried by a rod 40 secured to a slide 41 and is of such a shape (as seen in Fig. 4) that the stud 37 can revolve with the disk 35 without interfering with the rod 40. The slide 41 carries the cutting off tool which is held in a tool holder secured in the slots of said slide as is well understood and said slide 41 is connected by means of a rod 42 with a second slide 43 which is adapted to carry the recessing tool in the same way. To provide for the vertical adjustment of the tool holders both of the slides are provided with movable blocks 44. 44 having angle faces which work upon corresponding fixed faces on the slides, such blocks being adjustable by means of the screws 45. 45. The slide 41 also carries at its back a pin 46 loosely held in a hole in said slide but kept projecting therefrom by means of a small spiral spring indicated in Fig. 5 so as to engage with the edge of the frame and prevent its moving in one direction. When the disk 35 is revolved in the direction of the arrow Fig. 4 the stud 37 will come against the cam 39 and force the latter together with slides 41, 43 to the left so that the recessing tool carried by slide 43 will act to cut the metal at the head of the screw and form the head. This head is square as is usual in machine screws and the cutter is an ordinary straight one which acts to form the four flat faces thereof. As soon as the pin 37 has passed the cam 39 the spring 50 at the end of the slide 43 will retract the slides 41 and 43 until they are brought up by the pin 46 striking against the edge of the frame. The beveled edge 36 of the disk 35 now comes in contact with this pin and presses it into the slide 41 against the action of its spring so that the slide is freed and is immediately drawn back to its full extent by said spring 50 the cutting off tool carried by said slide being thus brought against the work for the purpose of cutting off the screw. The blank portion of the segment wheel 32 is now opposite the pinion 33 so that the latter is not acted on and it is during this interval that the rod is fed forward for the next screw to be cut.

What I claim is—

1. In a screw making machine, the combination with a fixed chuck, having radially disposed slots therein, tool holders contained in the said slots and having oppositely disposed inclined faces, a ring surrounding the said chuck and bearing on said inclined faces, and means for moving the said ring, substantially as described.

2. In a screw making machine, the combination with a fixed chuck, having radially disposed slots and holes therein, the holes being situated at varying depths from the face of the chuck, blocks contained in the said holes and carrying tool holders, and having inclined faces thereon, the blocks contained in the one set of holes having faces inclined in the opposite direction to the inclined faces of the blocks contained in the second set of holes, a ring surrounding the said chuck, and means for moving the said ring to bear upon the inclined faces upon each set of blocks, substantially as described.

3. In a screw-making machine, the combination with a fixed chuck, having radially disposed slots and holes therein, blocks contained in the said holes, the several blocks having oppositely disposed faces thereon, tool holders rigidly secured to the said blocks and projecting through the said inclined slots, a ring surrounding the said chuck, and means for moving the said chuck so that in its opposite movements it will bear upon the inclined faces upon the several blocks, substantially as described.

4. In a screw making machine, the combination with a fixed chuck, having radially disposed slots and holes therein, blocks contained in the said holes and having inclined faces, projecting pins thereon, tool holders rigidly secured to the said blocks, pivoted triggers adapted to engage with pins in the blocks; a ring surrounding the said chuck and means for moving the said ring to bear upon the inclined faces and to actuate the said triggers, substantially as described.

5. In a screw making machine, the combination with a fixed chuck, having radially disposed slots and holes therein, the holes being formed therein at varying distances from the face of the chuck; two series of blocks contained in the holes, and having inclined faces thereon, and carrying tool holders, each of the said series of blocks being contained in corresponding series of holes, and having the inclined faces thereon inclined in a reverse direction to the inclination of the faces upon the opposite series of blocks, pins projecting in different directions from the different series of blocks, pivoted triggers adapted to engage beneath the said pins; a ring encircling the said chuck and means for moving the said ring whereby it may be caused to bear upon the inclined faces of either series of blocks, and to actuate the said triggers, substantially as described.

6. In a screw making machine the combination with a fixed chuck provided with radial holes and slots, the holes being situated at varying depths from the face of the chuck, blocks with inclined faces contained in the said holes, tool holders secured to the said blocks by webs of different lengths, a ring loosely mounted on the outer face of the said chuck, and adapted to act on the said inclined faces to bring the tool holders successively in operation, means for withdrawing the tool holders, the said ring having recesses therein for causing the action of the ring on the inclines to be delayed and means for operating the ring, substantially as described.

7. In a screw making machine, the combination with a chuck body, 17, provided with slots 18, 18$^b$, 18$^c$, and holes 19, of pivoted triggers 30, tool holders 20, webs 18$^a$, and inclined blocks 19$^a$ carried by the said chuck body, pins 22 on the said blocks adapted to be engaged by the said triggers, and a sliding ring 25, for acting on the said blocks and triggers, substantially as described.

8. In a screw making machine, the combination with slides connected together and arranged on either side of the rod or material, and adapted to carry cutting and recessing tools, respectively, a cam connected to the said slide, a disk carrying a pin acting on the said cam, a locking pin on the said slide retracted by the said cam, and a spring for withdrawing the slide when unlocked, substantially as described.

9. In a screw making machine, the combination with slides connected together and arranged on either side of the rod or material, and adapted to carry cutting and recessing tools, respectively, a spring acting on the said slides, means for moving the said slides antagonistic to the said spring, a locking pin holding the said slides against the action of the spring and a driven cam having a beveled face adapted to retract the said pin and release the said slides, substantially as described.

10. In a screw making machine and in combination slides 41. 43 connected together arranged on either side of the rod or material and adapted to carry cutting and recessing tools respectively, a rod 40 and cam 39 attached to the slide 41, a disk 35 carrying a pin 37 adapted to act on the cam, a beveled edge 36 on said disk a pin 46 carried by the slide adapted to be acted on by the beveled edge of the cam, means for intermittently pushing forward the slides in one direction and a spring 50 for drawing the slides in the other substantially as described.

In testimony whereof I have hereunto set my hand in the presence of two subscribing witnesses.

THOMAS SOWERBUTTS.

Witnesses:
J. BRIERLY HOWARD,
CHARLES AINLEY.